(12) United States Patent
Fu et al.

(10) Patent No.: US 9,338,754 B2
(45) Date of Patent: May 10, 2016

(54) METHOD AND APPARATUS FOR INTERFERENCE COORDINATION

(71) Applicant: Samsung Electronics Co., Ltd., Suwon-si, Gyeonggi-do (KR)

(72) Inventors: Jingxing Fu, Beijing (CN); Chengjun Sun, Beijing (CN); Hong Wang, Beijing (CN); Yingyang Li, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/420,471

(22) PCT Filed: Aug. 8, 2013

(86) PCT No.: PCT/KR2013/007164
§ 371 (c)(1),
(2) Date: Feb. 9, 2015

(87) PCT Pub. No.: WO2014/025214
PCT Pub. Date: Feb. 13, 2014

(65) Prior Publication Data
US 2015/0208363 A1    Jul. 23, 2015

(30) Foreign Application Priority Data

Aug. 10, 2012 (CN) .......................... 2012 1 0285747

(51) Int. Cl.
*H04J 3/00* (2006.01)
*H04W 52/24* (2009.01)
(Continued)

(52) U.S. Cl.
CPC ............. *H04W 52/244* (2013.01); *H04L 5/00* (2013.01); *H04L 5/14* (2013.01); *H04W 16/10* (2013.01); *H04W 92/20* (2013.01)

(58) Field of Classification Search
CPC ... H04W 52/244; H04W 16/10; H04W 92/20; H04L 5/00; H04L 5/14
See application file for complete search history.

(56) References Cited

U.S. PATENT DOCUMENTS 7,483,404 B2    1/2009    Zhang
8,023,955 B2    9/2011    Anderson
(Continued)

FOREIGN PATENT DOCUMENTS

| KR | 10-2005-0091028 A | 9/2005 |
| KR | 10-2010-0075994 A | 7/2010 |
| WO | 2005/053342 A1 | 6/2005 |

*Primary Examiner* — Clemence Han
(74) *Attorney, Agent, or Firm* — Jefferson IP Law, LLP

(57) ABSTRACT

The application discloses a method for performing interference coordination between adjacent cells supporting dynamic TDD uplink and downlink configuration by a first evolved Node B (eNB). The method includes that: receiving, downlink interference degree information from a second eNB, wherein the downlink interference degree information is used for indicating a degree that uplink transmission of the second eNB is interfered by downlink transmission in a conflict subframe; and determining, according to the downlink interference degree information, whether to adjust downlink transmit power in the conflict subframe, if the downlink transmit power in the conflict subframe is to be adjusted, transmitting a CSI report configuration to UE of current cell, and configuring the UE of current cell to report a set of CSI respectively for the conflict subframe and a non-conflict subframe. By the solution of the present application, serious uplink and downlink interference between the adjacent cells can be avoided when the adjacent cells use different TDD uplink and downlink configurations.

16 Claims, 3 Drawing Sheets

(51) Int. Cl.
   *H04W 16/10*   (2009.01)
   *H04L 5/00*    (2006.01)
   *H04L 5/14*    (2006.01)
   *H04W 92/20*   (2009.01)

(56) References Cited

U.S. PATENT DOCUMENTS

| | | |
|---|---|---|
| 2006/0245397 A1 | 11/2006 | Zhang |
| 2007/0129094 A1 | 6/2007 | Jeong et al. |
| 2010/0278059 A1 | 11/2010 | Wu et al. |
| 2011/0243010 A1* | 10/2011 | Geirhofer ............ H04W 52/08 370/252 |
| 2013/0272170 A1* | 10/2013 | Chatterjee ............ H04W 28/02 370/280 |
| 2014/0036738 A1* | 2/2014 | Kim ..................... H04J 3/1694 370/280 |
| 2014/0098720 A1* | 4/2014 | Zeng ................. H04W 72/0446 370/280 |
| 2014/0105052 A1 | 4/2014 | Anderson |
| 2014/0133366 A1* | 5/2014 | Ribeiro ............... H04W 52/146 370/278 |
| 2014/0160967 A1* | 6/2014 | Gao ..................... H04W 24/10 370/252 |
| 2014/0370908 A1* | 12/2014 | Lee ...................... H04L 5/0032 455/452.1 |
| 2014/0376398 A1* | 12/2014 | Li ........................ H04L 1/0001 370/252 |
| 2015/0103706 A1* | 4/2015 | Li ........................ H04W 16/10 370/280 |
| 2015/0109973 A1* | 4/2015 | Yao ................... H04W 72/1231 370/280 |
| 2015/0163815 A1* | 6/2015 | Lei ........................ H04W 16/10 370/280 |
| 2015/0189664 A1* | 7/2015 | Hu ..................... H04W 72/082 370/329 |

* cited by examiner

METHOD AND APPARATUS FOR INTERFERENCE COORDINATION

PRIORITY

This application is a U.S. National Stage application under 35 U.S.C. §371 of an International application filed on Aug. 8, 2013 and assigned application number PCT/KR2013/007164, which claimed the benefit of a Chinese patent application filed on Aug. 10, 2012 in the State Intellectual Property Office and assigned Serial number 201210285747.7, the entire disclosure of which is hereby incorporated by reference.

TECHNICAL FIELD

The present application relates to radio communication technologies, and more particularly to a method and apparatus for performing interference coordination between adjacent cells supporting dynamic Time Division Duplexing (TDD) uplink and downlink configuration.

BACKGROUND ART

Long Term Evolution (LTE) technology supports a Frequency Division Duplexing (FDD) mode and a TDD mode. FIG. 1 is a schematic diagram illustrating the frame structure of a TDD system. In the TDD system, the length of each radio frame is 10 ms, and each radio frame is divided into two half frames with the length of 5 ms. Each half frame contains 8 time slots with the length of 0.5 ms and 3 special domains. The 3 special domains contain a Downlink Pilot Time Slot (DwPTS), a Guard Partition (GP) and an Uplink Pilot Time Slot (UpPTS). The total length of the 3 special domains is 1 ms. Each subframe is composed of two continuous time slots, that is, the $k^{th}$ subframe contains a time slot $2k$ and a time slot $2k+1$. The TDD system supports 7 types of uplink and downlink configurations, as shown in Table 1. In Table 1, "D" indicates downlink subframes, "U" indicates uplink subframes, and "S" indicates special subframes containing the above 3 special domains.

TABLE 1

Table 1, uplink and downlink configuration of LTE TDD

| Index of configuration | Switching point period | subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 10 ms | D | S | U | U | U | D | S | U | U | D |

In theory, each cell may use a TDD uplink and downlink configuration different from that used by an adjacent cell to adapt the change of traffic. Actually, if adjacent cells use different TDD uplink and downlink configurations, uplink transmission and downlink transmission of the adjacent cells will be interfered with each other, which will be illustrated hereinafter referring to FIG. 2.

FIG. 2 is a schematic diagram illustrating interference between adjacent cells using different TDD uplink and downlink configurations in the prior art. In FIG. 2, a subframe 3 of macro evolved Nobe B (eNB) is an uplink subframe, the subframe 3 of Low Power Node (LPN) is a downlink subframe, and thus these subframes are called conflict subframes in the present application, such as subframes 3 203 and 8 208. Subframes 0, 1, 4, 5, 6 and 9 of macro eNB are downlink subframes, the subframes 0, 1, 4, 5, 6 and 9 of LPN are also downlink subframes, and thus these subframes are called non-conflict subframes in the present application. In the conflict subframes, on one hand, the downlink data transmission of LPN interferes with uplink data that is transmitted to the macro eNB by all terminals of macro eNB, and the closer the distance from the LPN to the macro eNB is, the more serious the interference is; on the other hand, the uplink data that is transmitted by the terminals of macro eNB will seriously interfere with the downlink data received at terminals of LPN that are closer to the terminals of macro eNB.

FIG. 2 illustrates the interference between uplink transmission and downlink transmission of adjacent cell by taking the macro eNB and the LPN as an example, and the interference also occurs between other adjacent cells.

In order to avoid the interference between uplink transmission and downlink transmission of adjacent cells in the TDD system, the adjacent cells use the same TDD uplink and downlink configuration at present. However, uplink traffic and downlink traffic of different cells are unbalanced, that is, a certain cell has more uplink traffic and adjacent cells of the cell have more downlink traffic. In this case, different cells need to use different TDD uplink and downlink configurations to meet respective traffic requirements. The above two kinds of requirements are inconsistent, and thus a problem to be solved by the present application is to use different TDD uplink and downlink configurations in different cells, so as to meet the requirements of variation of uplink and downlink traffic, and avoid serious interference between uplink transmission and downlink transmission of adjacent cells.

DISCLOSURE OF INVENTION

Solution to Problem

The present application provides a method for performing interference coordination between adjacent cells supporting dynamic TDD uplink and downlink configuration, so as to use different TDD uplink and downlink configurations in different cells to meet the load requirements of variation of uplink and downlink traffic and control the degree of uplink and downlink interference between adjacent cells.

In accordance with an aspect of the prevent invention provides a method for performing interference coordination between adjacent cells supporting dynamic TDD uplink and downlink configuration by a first evolved Node B (eNB). The method includes receiving, downlink interference degree information from a second eNB, wherein the downlink interference degree information is used for indicating a degree that uplink transmission of the second eNB is interfered by downlink transmission in a conflict subframe, and determining, according to the downlink interference degree information, whether to adjust downlink transmit power in the conflict subframe, if the downlink transmit power in the conflict subframe is to be adjusted, transmitting a Channel State Information (CSI) report configuration to User Equipment (UE) of current cell, and configuring the UE of current cell to report a set of CSI respectively for the conflict subframe and a non-conflict subframe.

In accordance with another aspect of the present invention provides a method for performing interference coordination between adjacent cells supporting dynamic Time Division Duplexing (TDD) uplink and downlink configuration by a User Equipment (UE), the method includes measuring, in a cell that performs downlink transmission in the conflict subframe, interference in a non-conflict subframe and the conflict subframe respectively, when TDD uplink and downlink configurations of two adjacent cells have a conflict subframe, and transmitting an interference measurement report to an evolved Node B (eNB) covering the cell and receiving a Channel State Information (CSI) report configuration from the eNB covering the cell, wherein the CSI report configuration indicates to report a set of CSI respectively for the conflict subframe and the non-conflict subframe, or report a set of CSI for all subframes.

In accordance with further aspect of the present invention provides a first evolved Node B (eNB) for performing interference coordination between adjacent cells supporting dynamic Time Division Duplexing (TDD) uplink and downlink configuration, the eNB includes a transceiver for transmitting/receiving data to or from a User Equipment (UE) of a current cell and a controller for controlling operations of receiving downlink interference degree information from a second eNB, wherein the downlink interference degree information is used for indicating a degree that uplink transmission of the second eNB is interfered by downlink transmission in a conflict subframe and determining, according to the downlink interference degree information, whether to adjust downlink transmit power in the conflict subframe, if the downlink transmit power in the conflict subframe is to be adjusted, transmitting a Channel State Information (CSI) report configuration to User Equipment (UE) of a current cell, and configuring the UE of the current cell to report a set of CSI respectively for the conflict subframe and a non-conflict subframe.

In accordance with further still aspect of the present invention provides a User Equipment (UE) for performing interference coordination between adjacent cells supporting dynamic Time Division Duplexing (TDD) uplink and downlink configuration, the UE includes a transceiver for transmitting/receiving data to or from to an evolved Node B (eNB) and a controller controlling operations of measuring, in a cell that performs downlink transmission in the conflict subframe, interference in a non-conflict subframe and the conflict subframe respectively, when TDD uplink and downlink configurations of two adjacent cells have a conflict subframe, transmitting an interference measurement report to an evolved Node B (eNB) covering the cell, and receiving a Channel State Information (CSI) report configuration from the eNB covering the cell, wherein the CSI report configuration indicates to report a set of CSI respectively for the conflict subframe and the non-conflict subframe, or report a set of CSI for all subframes.

MODE FOR THE INVENTION

In order to make the object, technical solution and merits of the present application clearer, the present application will be illustrated in detail hereinafter with reference to the accompanying drawings and examples.

In the TDD system, suppose adjacent cells use different TDD uplink and downlink configurations, that is, an eNB may dynamically adjust its TDD uplink and downlink configuration according to the load change of uplink and downlink traffic of current cell, so as to meet the load requirements of uplink and downlink traffic.

An idea of the present application includes, on one hand, determining uplink and downlink interference between adjacent cells through measuring, and determining according to the uplink and downlink interference whether to adjust the downlink transmit power of interference cell in a conflict subframe, to meet the requirements of uplink and downlink interference; on the other hand, determining interference on the UE in the conflict subframe and in a non-conflict subframe through measuring, and determining according to the interference degree whether to use a modulation mode having higher anti-interference capability to perform data transmission in the conflict subframe, so as to implement interference coordination when the adjacent cells use different TDD uplink and downlink configurations, and avoid serious uplink and downlink interference between the adjacent cells.

Figure 1:
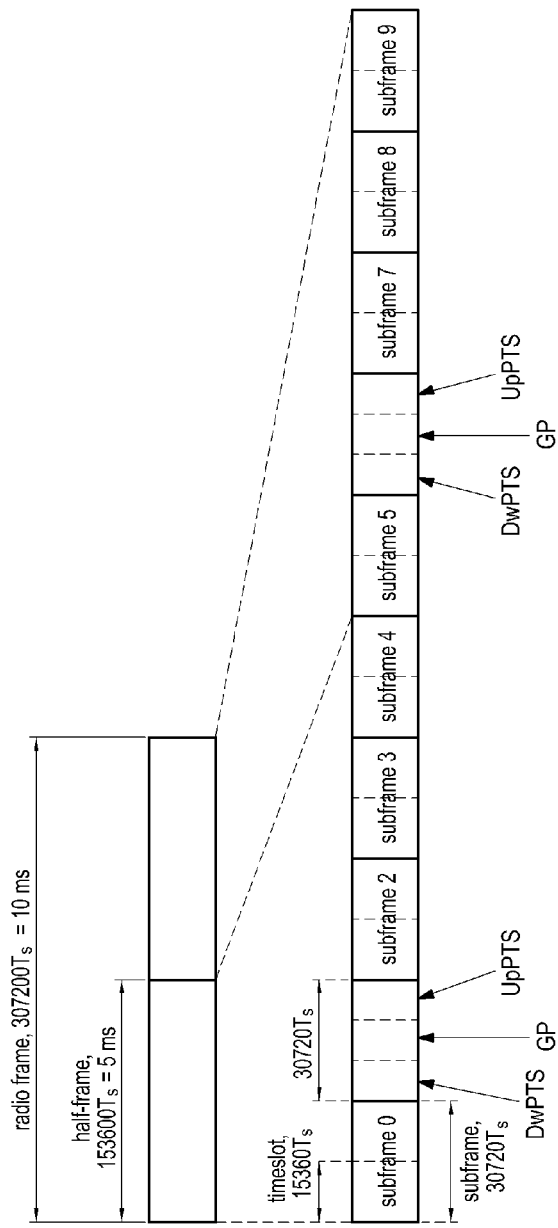
FIG. 1 is a schematic diagram illustrating the frame structure of a TDD system in the prior art.
Figure 2:
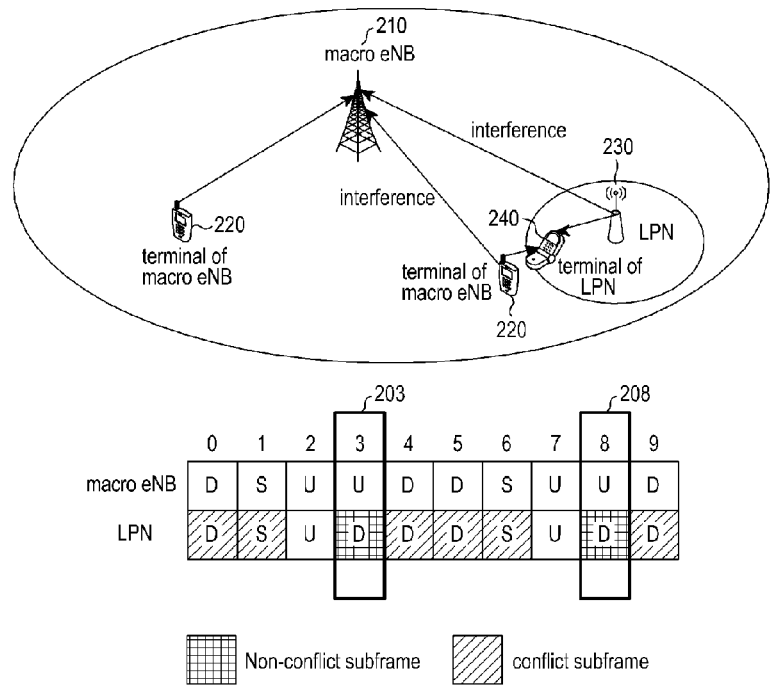
FIG. 2 is a schematic diagram illustrating interference between adjacent cells using different TDD uplink and downlink configurations in the prior art.
Figure 3:
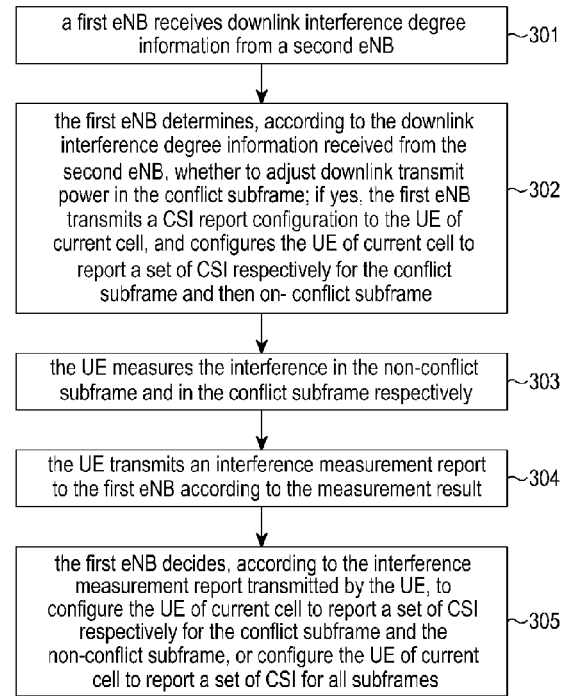
FIG. 3 is a flowchart illustrating an interference coordination method according to the present application.

FIG. 3 is a flowchart illustrating an interference coordination method according to the present application. The method includes following blocks.

In block 301, a first eNB receives downlink interference degree information from a second eNB.

The downlink interference degree information is used for indicating a degree that uplink transmission of the second eNB is interfered by downlink transmission in a conflict subframe The second eNB may calculate a value indicating an interference degree, and transmits the value to the first eNB by taking the value as the downlink interference degree information, where the value is calculated by taking all PRBs of whole bandwidth as a unit and according to the strength that the uplink transmission of the second eNB is interfered by the downlink interference on all PRB pairs of whole bandwidth of the conflict subframe.

Or, the second eNB may calculate multiple values indicating the interference degree, and transmits the values to the first eNB by taking the values as the downlink interference degree information, where the values are calculated by taking a group of adjacent PRB pairs as a unit (e.g., taking a PRB Group defined in the LTE specification as a unit) and according to the strength that the uplink transmission of the second eNB is interfered by the downlink interference on each group of adjacent PRB pairs of the conflict subframe.

Or, the second eNB may calculate multiple values indicating the interference degree, and transmits the values to the first eNB by taking the values as the downlink interference degree information, where the values are calculated by taking a PRB pair as a unit and according to the strength that the uplink transmission of the second eNB is interfered by the downlink interference on each PRB pair of the conflict subframe.

An Overload Indicator (OI) and a High Interference Indicator (HII) defined the current LTE specification may be used as the downlink interference degree information described in the present application, to indicate the degree of interference in the conflict subframe. That is, the eNB transmits different OIs and HIIs for the non-conflict subframe and the conflict subframe. Because the interference in the non-conflict subframe and the interference in the conflict subframe are different, the OI and HII used for the non-conflict subframe and the OI and HII used for the conflict subframe are different. In addition, besides the OI and the HII for indicating the degree of interference in the conflict subframe, the present application does not restrict the mode for indicating the degree of interference in the conflict subframe, and another method may be used to obtain information for indicating the interference degree.

For example, a method for indicating the downlink interference degree information includes that, the degree that the uplink signals of macro eNB is interfered by the downlink signals of adjacent eNB in the conflict subframe is represented with 1 bit. If the value of the downlink interference degree information is configured as 1, it is indicated that the degree that the downlink signals of adjacent eNB interferes with the uplink signals of macro eNB is serious. If the value of the downlink interference degree information is configured as 0, it is indicated that the degree that the downlink signals of adjacent eNB interferes with the uplink signals of micro eNB is not serious. According to the above method for indicating the interference degree, 1 bit may be used to indicate the interference degree of all PRB pairs of whole bandwidth, or 1 bit is used to indicate the interference degree of each PRB group or each PRB pair. The method for indicating the interference degree is illustrated hereinafter referring to an example.

Figure 4:
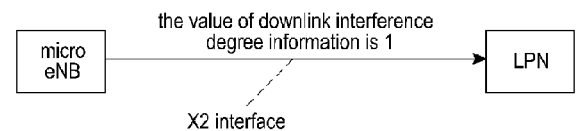
FIG. 4 is a schematic diagram illustrating an example of downlink interference degree information according to the present application.

Suppose a macro eNB and a LPN both use a TDD uplink and downlink configuration 1. Because the requirement of downlink traffic of LPN is large, the TDD uplink and downlink configuration of LPN is dynamically changed into a TDD uplink and downlink configuration 2. In this case, subframes 3 and 8 are uplink subframes on the macro eNB and are downlink subframes on the LPN, and thus the downlink subframes of LPN may interfere with the uplink subframes of macro eNB. By the above method, the macro eNB may transmit the downlink interference degree information to the LPN via an X2 interface or an S1 interface. Suppose the value of the downlink interference degree information received by LPN from the macro eNB is 1, the LPN may learn that the uplink signals of macro eNB is seriously interfered by the downlink signals of adjacent eNB in the conflict subframe, as shown in FIG. 4.

Another method for indicating the downlink interference degree information includes that, the degree that the uplink signals of macro eNB is interfered by the downlink signals of adjacent eNB in the conflict subframe is represented with 2 bits, and the interference degree is classified as low, moderate and high levels. If the value of the downlink interference degree information is configured as 00, it is indicated that the degree that the downlink signals of adjacent eNB interferes with the uplink signals of macro eNB is low, if the value of the downlink interference degree information is configured as 01, it is indicated that the degree that the downlink signals of adjacent eNB interferes with the uplink signals of macro eNB is moderate, and if the value of the downlink interference degree information is configured as 10, it is indicated that the degree that the downlink signals of adjacent eNB interferes with the uplink signals of macro eNB is high. The value 11 of downlink interference degree information is reserved. According to the above method for indicating the interference degree, 2 bits may be used to indicate the interference degree of all PRB pairs of whole bandwidth, or 2 bits are used to indicate the interference degree of each PRB group or each PRB pair. The method for indicating the interference degree is illustrated hereinafter referring to an example.

Figure 5:
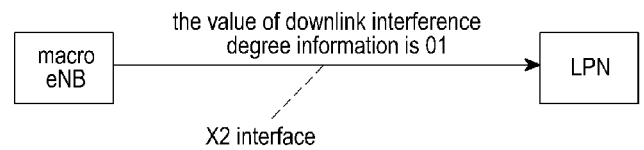
FIG. 5 is a schematic diagram illustrating an example of downlink interference degree information according to the present application.

Suppose the macro eNB and the LPN both use the TDD uplink and downlink configuration 1. Because the requirement of downlink traffic of LPN is large, the TDD uplink and downlink configuration of LPN is dynamically changed into the TDD uplink and downlink configuration 2. In this case, the subframes 3 and 8 are uplink subframes on the macro eNB and are downlink subframes on the LPN, and thus the downlink subframes of LPN may interfere with the uplink subframes of macro eNB. By the above method, the macro eNB may transmit the downlink interference degree information to the LPN via the X2 interface or the S1 interface. Suppose the value of the downlink interference degree information received by LPN from the macro eNB is 1, the LPN may learn that the uplink signals of macro eNB is moderately interfered by the downlink signals of adjacent eNB in the conflict subframe, as shown in FIG. 5.

In practical implementations, the downlink interference degree information may be represented with 3 or more bits, e.g., N bits. According to the above method for indicating the interference degree, N bits may be used to indicate the interference degree of all PRB pairs of whole bandwidth, or N bits are used to indicate the interference degree of each PRB group or each PRB pair.

In block 302, the first eNB determines, according to the downlink interference degree information received from the second eNB, whether to adjust downlink transmit power in the conflict subframe; if yes, the first eNB transmits a CSI report configuration to the UE of current cell, and configures the UE of current cell to report a set of CSI respectively for the conflict subframe and the non-conflict subframe.

After the UE accesses a dynamic TDD cell, the UE receives the CSI report configuration transmitted by the eNB.

According to the present application, one type of CSI report configuration indicates to report a set of CSI for all downlink subframes, and the other one type of CSI report configuration indicates to report two sets of CSI. One set of CSI is for the non-conflict subframe, that is, this set of CSI is obtained through measuring the non-conflict subframe, and the other set of CSI is for the conflict subframe, that is, this set of CSI is obtained through measuring the conflict subframe.

Figure 6:
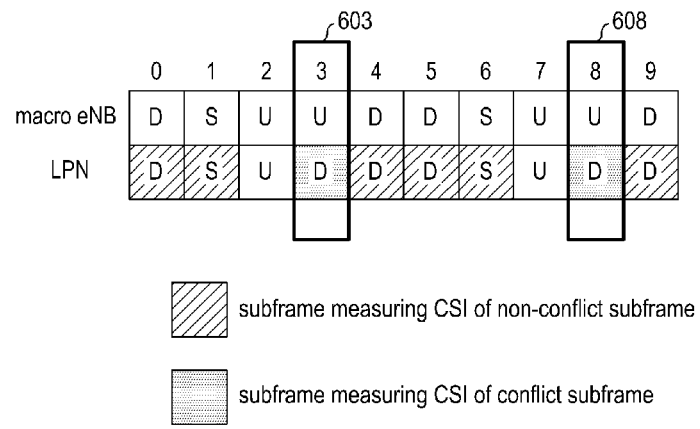
FIG. 6 is a schematic diagram illustrating an example that UE performs an interference measurement report according to the present application.

Suppose the macro eNB and the LPN both use the TDD uplink and downlink configuration 1. Because the requirement of downlink traffic of LPN is large, the TDD uplink and downlink configuration of LPN is dynamically changed into the TDD uplink and downlink configuration 2. In this case, the subframes 3 603 and 8 608 are uplink subframes on the macro eNB and are downlink subframes on the LPN, and thus the subframes 3 603 and 8 608 are conflict subframes. The Subframes 0, 1, 4, 5, 6 and 9 are downlink subframes on the macro eNB and are also downlink subframes on the LPN, and thus the subframes 0, 1, 4, 5, 6 and 9 are non-conflict subframes. When the CSI report configuration received by the UE indicates to report two sets of CSI, the UE measures the downlink subframes 0, 1, 4, 5, 6 and 9 to obtain one set of CSI, and measures the downlink subframes 3 603 and 8 608 to obtain the other set of CSI, and then returns the two sets of CSI, as shown in FIG. 6.

According to related protocols, suppose the UE is to report the CSI in a subframe n, the UE needs to perform measurement in a subframe n-k according to the CSI report configuration. If the subframe n-k is not a downlink subframe, the UE searches subframes before the subframe n-k until the UE finds a downlink subframe closest to the subframe n-k.

When the eNB configures the UE to return one set of CSI respectively for the conflict subframe and the non-conflict subframe, the UE performs two measurements at the same time, one measurement is performed for the conflict subframe and the other measurement is performed for the non-conflict subframe. Suppose the UE is to report the CSI for the conflict subframe in the subframe n, the UE needs to perform measurement in the subframe n-k according to the CSI report configuration corresponding to the conflict subframe. If the subframe n-k is not a conflict subframe, the UE searches subframes before the subframe n-k until the UE finds a conflict subframe closest to the subframe n-k.

In block 303, the UE measures the interference in the non-conflict subframe and in the conflict subframe respectively.

After the UE accesses the dynamic TDD cell, when the TDD uplink and downlink configurations of the current cell and an adjacent cell have a conflict subframe, the UE may respectively measure the interference in the non-conflict subframe and in the conflict subframe, and transmits an interference measurement report to the eNB of the current cell.

A method of learning by the UE whether the TDD uplink and downlink configurations of the current cell and the adjacent cell have the conflict subframe includes that, suppose the current cell has a uniform TDD uplink and downlink configuration, when the eNB covering the current cell informs the UE of a new TDD uplink and downlink configuration through a RRC signaling, the UE compares the uniform TDD uplink and downlink configuration with the new TDD uplink and downlink configuration, to learn whether there is a conflict subframe and the location of the conflict subframe. Another method includes that the eNB informs the UE that the current cell works on a dynamic mode, and then dynamically configures a certain uplink subframe or several uplink subframes in the uniform TDD uplink and downlink configuration into downlink subframes through a PDCCH. In this case, the UE may learn that the dynamically configured downlink subframes are conflict subframes. Of cause, the present application is not limited to the above two methods in practical implementations.

Herein, the UE may measure a RSSI in whole receiving bandwidth of the non-conflict subframe, and may also measure a RSSI in whole receiving bandwidth of the conflict subframe.

In this block, the object of measuring the interference in the conflict subframe and in the non-conflict subframe by the UE is to determine whether the downlink signals of UE in the current cell is seriously interfered in the conflict subframe by the uplink signals of UE in an adjacent cell.

In block 304, the UE transmits an interference measurement report to the first eNB according to the measurement result.

According to the method of the present application, the interference measurement report transmitted by the UE may be an event-driven report, i.e., a report that is transmitted when a condition is met, and may also be a periodical report. For the event-driven report, a method for configuring the condition includes that, when the difference between the RSSI of the non-conflict subframe and the RSSI of the conflict subframe is larger than a predefined threshold, the UE transmits the interference measurement report to the eNB.

In block 305, the first eNB decides, according to the interference measurement report transmitted by the UE, to configure the UE of current cell to report a set of CSI respectively for the conflict subframe and the non-conflict subframe, or configure the UE of current cell to report a set of CSI for all subframes.

The first eNB may adjust a modulation encoding mode of downlink data through adjusting the CSI report configuration of the UE, so as to improve anti-interference performance of downlink data transmission. For example, when the UE is seriously interfered in the conflict subframe, the first eNB may perform downlink data transmission in the conflict subframe through a QPSK modulation mode, and transmits a CSI report configuration for the conflict subframe to the UE; when the UE is not seriously interfered in the conflict subframe, the first eNB may perform downlink data transmission in the conflict subframe and in the non-conflict subframe through a 16QAM modulation mode, and configure the UE to report one set of CSI.

And thus, the method flowchart shown in FIG. 3 ends.

As can be seen from the above solution of the present application, in the interference coordination method applied to the eNB, the uplink and downlink interference between adjacent cells is measured first, and then it is determined according to the uplink and downlink interference whether to adjust the downlink transmit power of interference cell in the conflict subframe, to meet the requirements of uplink and downlink interference, thereby avoiding serious uplink and downlink interference between the adjacent cells when the adjacent cells use different TDD uplink and downlink configurations.

In another interference coordination method applied to the UE provided by the present application, when the TDD uplink and downlink configurations of two adjacent cells have a conflict subframe, the UE in a cell that performs downlink transmission in the conflict subframe measures the interference in the non-conflict subframe and in the conflict subframe respectively, and transmits an interference measurement report to an eNB covering the cell, so that the eNB can learn the case that the UE in the cell is interfered in the conflict subframe, and determines whether to configure the UE in the cell to report a set of CSI respectively for the conflict subframe and the non-conflict subframe, thereby implementing interference coordination through improving the anti-interference capability of data transmission of the cell.

The foregoing is only preferred examples of the present application and is not used to limit the protection scope of the present application. Any modification, equivalent substitution and improvement without departing from the spirit and principle of the present application are within the protection scope of the present application.

The invention claimed is:

1. A method for performing interference coordination between adjacent cells supporting dynamic Time Division Duplexing (TDD) uplink and downlink configuration by a first evolved Node B (eNB), the method comprising:
    receiving downlink interference degree information from a second eNB, the downlink interference degree information being used for indicating a degree that uplink transmission of the second eNB is interfered by downlink transmission in a conflict subframe; and
    determining, according to the downlink interference degree information, whether to adjust downlink transmit power in the conflict subframe, if the downlink transmit power in the conflict subframe is to be adjusted, transmitting a Channel State Information (CSI) report configuration to User Equipment (UE) of a current cell, and configuring the UE of the current cell to report a set of CSI respectively for the conflict subframe and a non-conflict subframe.

2. The method of claim 1, further comprising:
receiving an interference measurement report from the UE of the current cell, the interference measurement report indicating a measurement result obtained through measuring interference in the conflict subframe and in the non-conflict subframe respectively by the UE of the current cell; and
deciding, according to the interference measurement report received from the UE of the current cell, to configure the UE of the current cell to report a set of CSI respectively for the conflict subframe and the non-conflict subframe.

3. The method of claim 1, wherein one of:
the downlink interference degree information is a value indicating an interference degree, the value indicating the interference degree is calculated by taking all Physical Resource Blocks (PRBs) of whole bandwidth as a unit and according to strength that the uplink transmission of the second eNB is interfered by the downlink transmission on all PRB pairs of whole bandwidth of the conflict subframe,
the downlink interference degree information is multiple values medicating the interference degree, wherein the values are calculated by taking a group of adjacent PRB pairs as a unit and according to strength that the uplink transmission of the second eNB is interfered by the adjacent cells downlink transmission on each group of adjacent PRB pairs of the conflict subframe, or
the downlink interference degree information is multiple values indicating the interference degree, the multiple values are calculated by taking a PRB pair as a unit and according to strength that the uplink transmission of the second eNB is interfered by the downlink transmission on each PRB pair of the conflict subframe.

4. The method of claim 3,
wherein the value indicating the interference degree is born by an Overload Indicator (OI) and a High Interference Indicator (HII), and
wherein the second eNB transmits different OIs and HIIs for the non-conflict subframe and the conflict subframe to the first eNB.

5. The method of claim 3, wherein one of:
the value indicating the interference degree is represented with 1 bit, one value of the 1 bit indicates that the degree that the uplink transmission of the second eNB is interfered by the downlink transmission in the conflict subframe is serious, and another value of the 1 bit indicates that the degree that the uplink transmission of the second eNB is interfered by the downlink transmission in the conflict subframe is not serious,
the value indicating the interference degree is represented with 2 bits, a first value of the 2 bits indicates that the degree that the uplink transmission of the second eNB is interfered by the downlink transmission in the conflict subframe is low, a second value of the 2 bits indicates that the degree that the uplink transmission of the second eNB is interfered by the downlink transmission in the conflict subframe is moderate, and a third value of the 2 bits indicates that the degree that the uplink transmission of the second eNB is interfered by the downlink transmission in the conflict subframe is high, or
the value indicating the interference degree is represented with N bits, N is larger than 2, different values of the N bits respectively indicate that different degrees that the uplink transmission of the second eNB is interfered by the downlink transmission in the conflict subframe.

6. A method for performing interference coordination between adjacent cells supporting dynamic Time Division Duplexing (TDD) uplink and downlink configuration by a User Equipment (UE), the method comprising:
measuring, in a cell that performs downlink transmission in a conflict subframe, interference in a non-conflict subframe and the conflict subframe respectively, when the TDD uplink and downlink configurations of two adjacent cells have the conflict subframe, and
transmitting an interference measurement report to an evolved Node B (eNB) covering the cell; and
receiving a Channel State Information (CSI) report configuration from the eNB covering the cell, wherein the CSI report configuration indicates to report a set of CSI respectively for the conflict subframe and the non-conflict subframe, or report a set of CSI for all subframes.

7. The method of claim 6, wherein the interference measurement report transmitted to the eNB is an event-driven report or a periodical report.

8. The method of claim 7, further comprising: measuring a Received Signal Strength Indication (RSSI) of the conflict subframe and a RSSI of the non-conflict subframe, and transmitting when the difference between the RSSI of the conflict subframe and the RSSI of the non-conflict subframe is larger than a predefined threshold, an interference measurement report to the eNB covering the cell.

9. A first evolved Node B (eNB) for performing interference coordination between adjacent cells supporting dynamic Time Division Duplexing (TDD) uplink and downlink configuration, the first eNB comprising:
a transceiver configured to transmit and receive data to or from a User Equipment (UE) of a current cell; and
a controller configured:
to control operations of receiving downlink interference degree information from a second eNB, the downlink interference degree information being used for indicating a degree that uplink transmission of the second eNB is interfered by downlink transmission in a conflict subframe,
to determine, according to the downlink interference degree information, whether to adjust downlink transmit power in the conflict subframe,
to transmit, if the downlink transmit power in the conflict subframe is to be adjusted, a Channel State Information (CSI) report configuration to User Equipment (UE) of a current cell, and
to configure the UE of the current cell to report a set of CSI respectively for the conflict subframe and a non-conflict subframe.

10. The first eNB of claim 9, wherein the controller is further configured:
to receive an interference measurement report from the UE of the current cell, wherein the interference measurement report indicates a measurement result obtained through measuring interference in the conflict subframe and in the non-conflict subframe respectively by the UE of the current cell, and
to determine, according to the interference measurement report received from the UE of the current cell, whether to configure the UE of the current cell to report a set of CSI respectively for the conflict subframe and the non-conflict subframe.

11. The first eNB of claim 9, wherein one of:
the downlink interference degree information is a value indicating an interference degree, wherein the value is calculated by taking all Physical Resource Blocks (PRBs) of whole bandwidth as a unit and according to strength that the uplink transmission of the second eNB is interfered by the downlink transmission on all PRB pairs of whole bandwidth of the conflict subframe,
the downlink interference degree information is multiple values indicating the interference degree, wherein the values are calculated by taking a group of adjacent PRB pairs as a unit and according to strength that the uplink transmission of the second eNB is interfered by the downlink transmission on each group of adjacent PRB pairs of the conflict subframe, or
the downlink interference degree information is multiple values indicating the interference degree, wherein the values are calculated by taking a PRB pair as a unit and according to strength that the uplink transmission of the second eNB is interfered by the downlink transmission on each PRB pair of the conflict subframe.

12. The first eNB of claim 11,
wherein the value indicating the interference degree is born by an Overload Indicator (OI) and a High Interference Indicator (HII), and
wherein the second eNB transmits different OIs and HIIs for the non-conflict subframe and the conflict subframe to the first eNB.

13. The first eNB of claim 11, wherein one of:
the value indicating the interference degree is represented with 1 bit, one value of the 1 bit indicates that the degree that the uplink transmission of the second eNB is interfered by the downlink transmission in the conflict subframe is serious, and another value of the 1 bit indicates that the degree that the uplink transmission of the second eNB is interfered by the downlink transmission in the conflict subframe is not serious,
the value indicating the interference degree is represented with 2 bits, a first value of the 2 bits indicates that the degree that the uplink transmission of the second eNB is interfered by the downlink transmission in the conflict subframe is low, a second value of the 2 bits indicates that the degree that the uplink transmission of the second eNB is interfered by the downlink transmission in the conflict subframe is moderate, and a third value of the 2 bits indicates that the degree that the uplink transmission of the second eNB is interfered by the downlink transmission in the conflict subframe is high, or
the value indicating the interference degree is represented with N bits, N is larger than 2, different values of the N bits respectively indicate that different degrees that the uplink transmission of the second eNB is interfered by the downlink transmission in the conflict subframe.

14. A User Equipment (UE) for performing interference coordination between adjacent cells supporting dynamic Time Division Duplexing (TDD) uplink and downlink configuration, the UE comprising:
a transceiver configured to transmit and receive data to or from to an evolved Node B (eNB); and
a controller configured:
to measure, in a cell that performs downlink transmission in a conflict subframe, interference in a non-conflict subframe and the conflict subframe respectively when the TDD uplink and downlink configurations of two adjacent cells have the conflict subframe, transmitting an interference measurement report to an evolved Node B (eNB) covering the cell, and
to receive a Channel State Information (CSI) report configuration from the eNB covering the cell, the CSI report configuration indicating to report a set of CSI respectively for the conflict subframe and the non-conflict subframe, or to report a set of CSI for all subframes.

15. The UE of claim 14, wherein the interference measurement report transmitted to the eNB is an event-driven report or a periodical report.

16. The UE of claim 15, wherein the controller is further configured: to measure a Received Signal Strength Indication (RSSI) of the conflict subframe and a RSSI of the non-conflict subframe, and to transmit, when the difference between the RSSI of the conflict subframe and the RSSI of the non-conflict subframe is larger than a predefined threshold, an interference measurement report to the eNB covering the cell.

* * * * *